Dec. 26, 1944.　　　B. Y. JAMES　　　2,365,704
PACKAGE WRAPPING
Filed Jan. 2, 1942　　　6 Sheets-Sheet 1
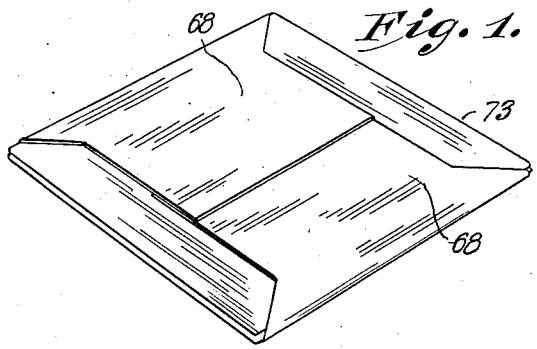
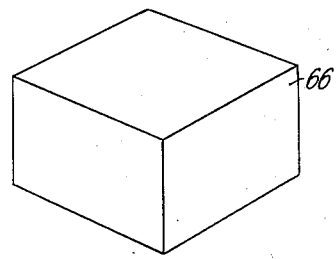
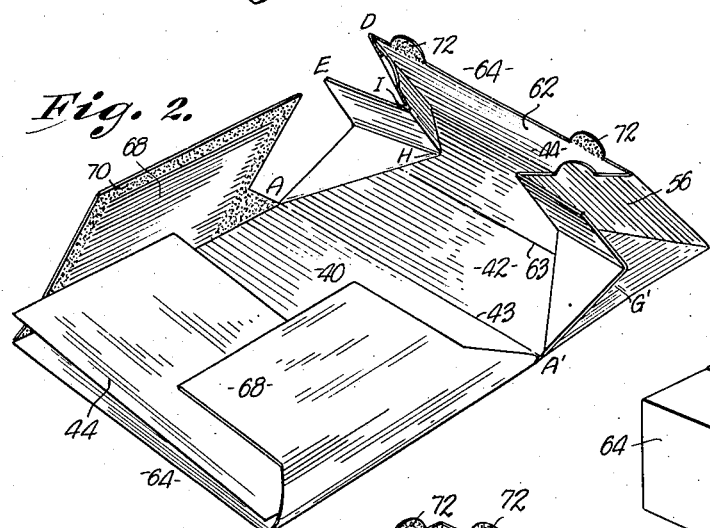
INVENTOR.
Bill Yates James Dec. 26, 1944. B. Y. JAMES 2,365,704
PACKAGE WRAPPING
Filed Jan. 2, 1942 6 Sheets-Sheet 2

INVENTOR.
Bill Yates James
BY
ATTORNEY.

Dec. 26, 1944.  B. Y. JAMES  2,365,704
PACKAGE WRAPPING
Filed Jan. 2, 1942  6 Sheets-Sheet 3

INVENTOR.
Bill Yates James
BY
ATTORNEY.

Dec. 26, 1944. B. Y. JAMES 2,365,704
PACKAGE WRAPPING
Filed Jan. 2, 1942 6 Sheets-Sheet 4
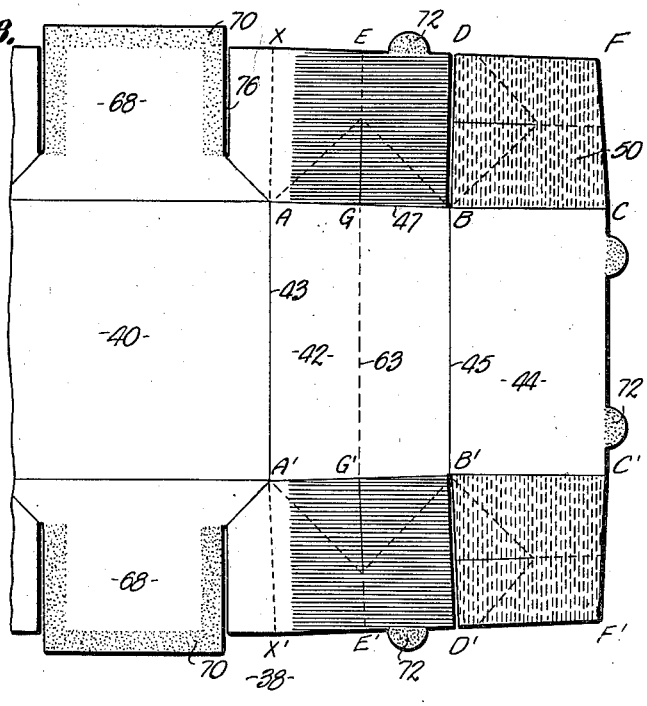
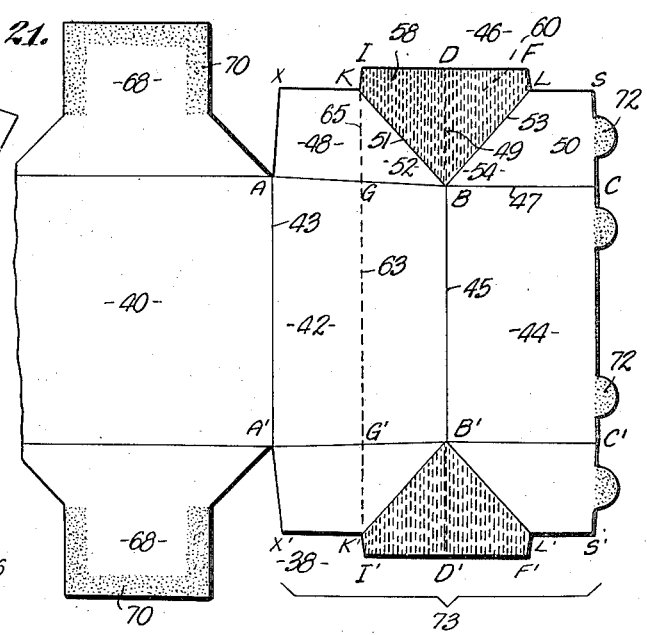
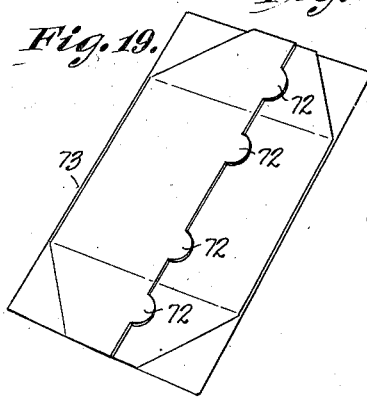
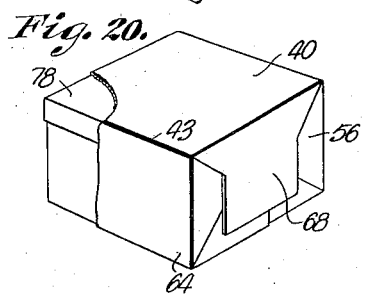
INVENTOR.
Bill Yates James
BY
ATTORNEY.

Dec. 26, 1944. B. Y. JAMES 2,365,704
PACKAGE WRAPPING
Filed Jan. 2, 1942 6 Sheets-Sheet 5
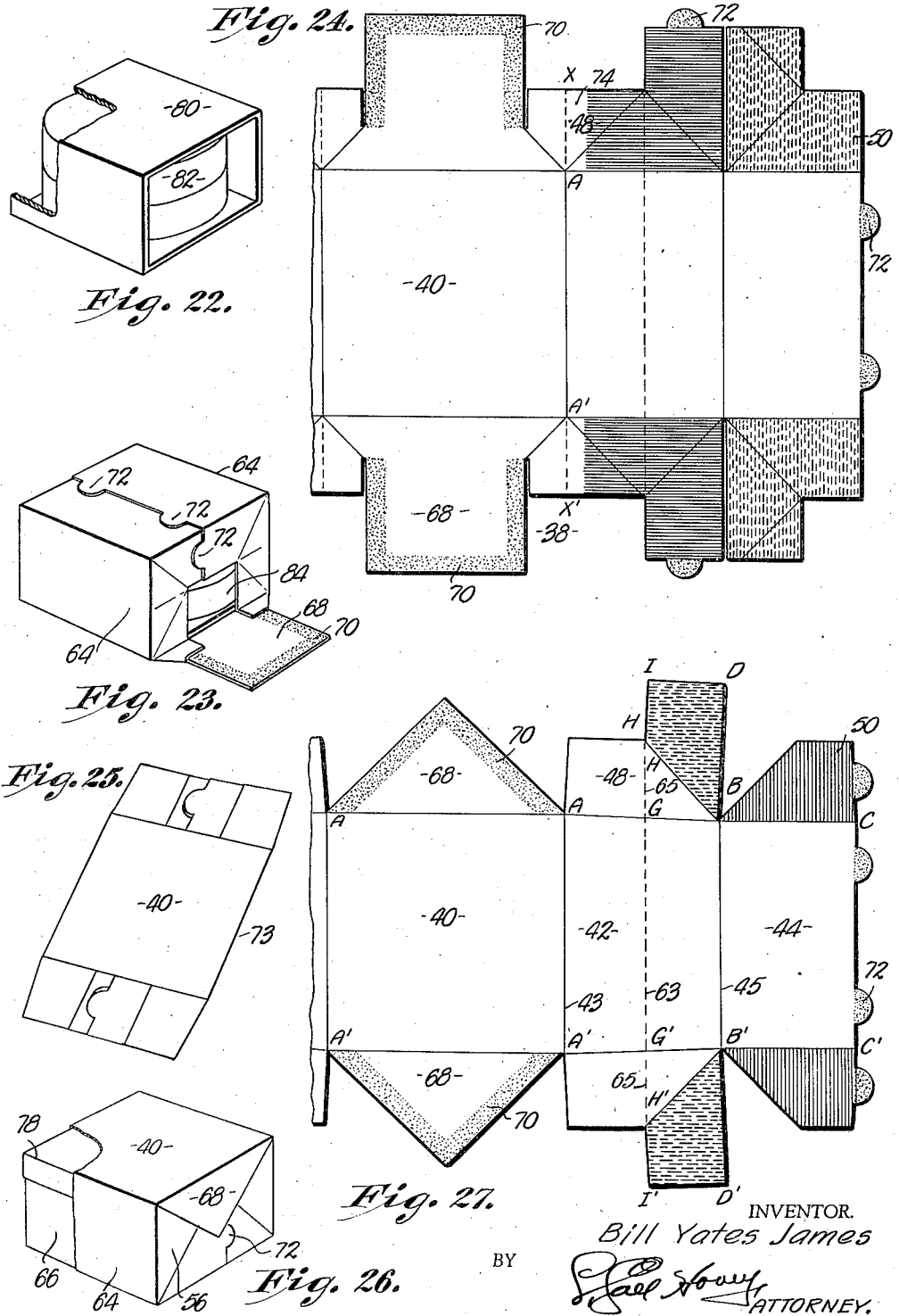
INVENTOR.
Bill Yates James
BY
ATTORNEY.

Dec. 26, 1944. B. Y. JAMES 2,365,704
PACKAGE WRAPPING
Filed Jan. 2, 1942 6 Sheets-Sheet 6
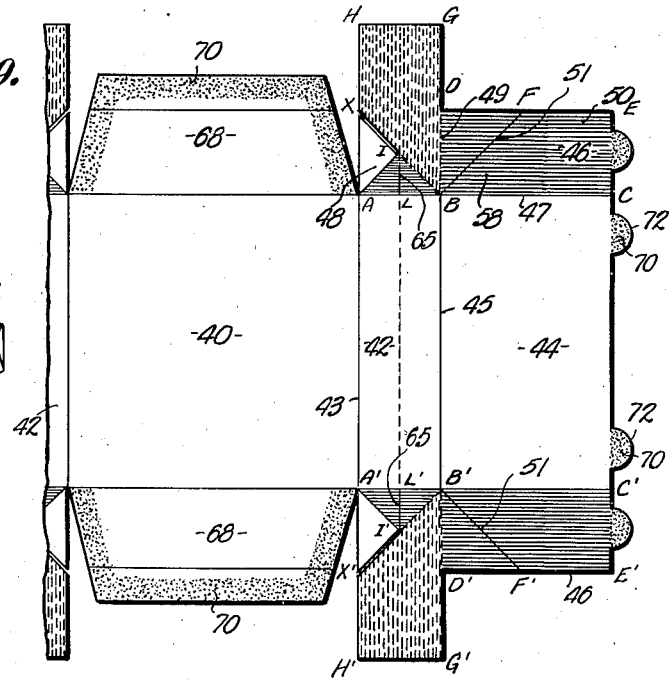
Fig. 29.
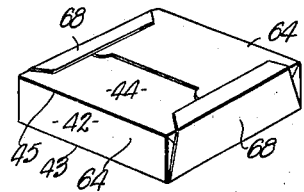
Fig. 28.
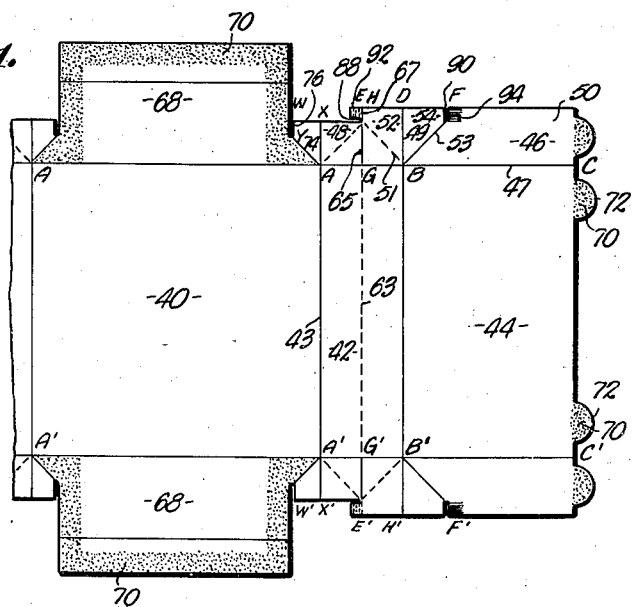
Fig. 31.
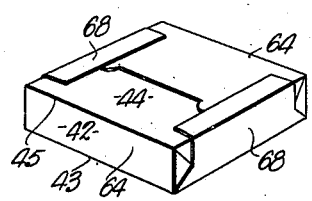
Fig. 30.
INVENTOR.
Bill Yates James
BY
ATTORNEY.

Patented Dec. 26, 1944

2,365,704

UNITED STATES PATENT OFFICE 2,365,704

PACKAGE WRAPPING

Bill Y. James, Miami, Okla., assignor of one-half to Caroline Y. James, Miami, Okla.

Application January 2, 1942, Serial No. 425,436

2 Claims. (Cl. 229—87)

This invention relates to packaging and has as its principal aim the provision of a pre-formed package wrapping which may be placed about a package of predetermined size and shape with a minimum amount of effort and labor.

Another object of this invention is the design of a package wrapping of the type as aforesaid which shall have a very pleasing and artistic appearance as well as incorporating therein the features above mentioned.

A further aim of this invention is embodied in a pre-formed wrapping with the characteristics described above, which forms a very compact, flat article before the same is placed in position on the package. This aim makes it possible for the article to be shipped and stored in considerable quantities in a small space and lends itself well to counter service.

The invention further contemplates a package wrapping having a unique series of folds, bends and plaits therein whereby the article may be manufactured from an initially flat sheet of paper and assembled to provide a wrapping having reinforced corners and a relatively high degree of structural strength.

This invention further results in an article which may be assembled on the package to be wrapped and secured in place without special tools, string or the usual appurtenances of the wrapping art. The parts of which this invention is comprised, are united and held in position by the structure and means incorporated in the article itself.

It is a yet further aim of this invention to provide wrapping means wherein all the folds thereof that are not made on the outer edges of the package are projected inwardly toward the package. Thus, it is contemplated that all the various areas of the package—top, side, ends and bottom, will lie closely adjacent the package since the folds on these surfaces project inwardly and not outwardly.

Further aims and objects of this invention will become apparent from the following description thereof, reference being had to the accompanying drawings wherein:

Fig. 1 is a perspective view of a form of the package wrapping when the same is folded for storage.

Fig. 2 is a perspective view of a form of the package wrapping when the same is partially unfolded preparatory to use thereof.

Fig. 3 is a perspective view of the article to be wrapped.

Fig. 4 is a perspective view of the package wrapping and article to be wrapped, the former being partially in place on the latter to illustrate the means of positioning the wrapping on the article.

Fig. 5 is a perspective view of the wrapping after being positioned on the article.

Fig. 6 is a stretch out view of a form incorporated in a modification of the invention; and Figs. 9, 12, 15, 18, 21, 24, 27, 29 and 31 are partial stretch out views of modifications of several forms used in making the wrapping.

Figs. 7, 10, 13, 16, 19 and 25 are perspective views of modifications of the wrappings, when the same are folded for storage, of forms shown in Figs. 9, 12, 15, 18, 21 and 27 respectively.

Figures 6, 7, 8, 9:
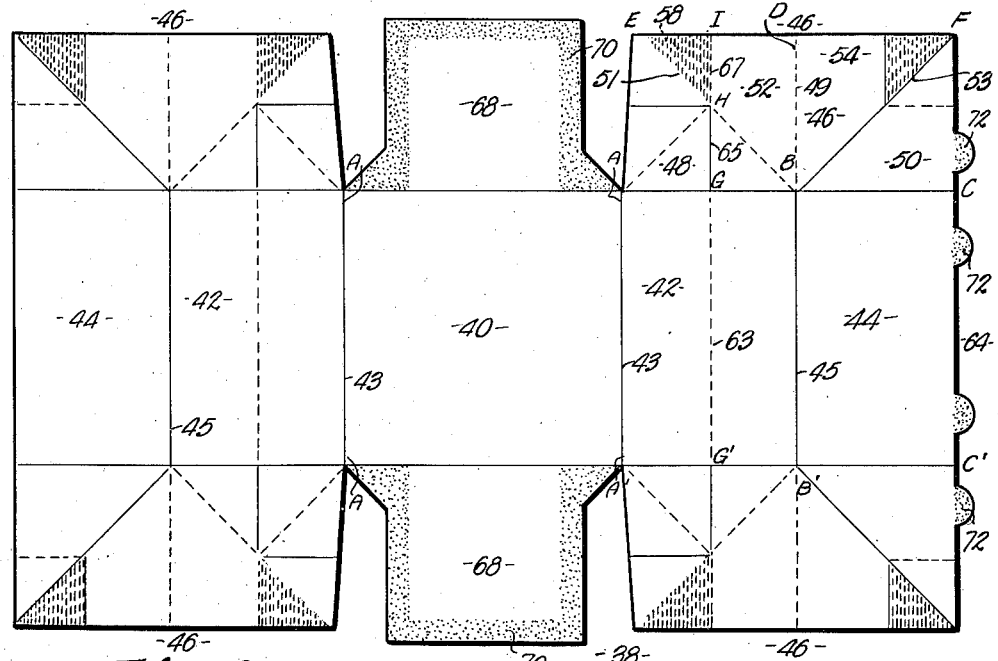

Figs. 8, 11, 14, 17, 20, 23, 26, 28 and 30 respectively are perspective views of the wrapping, in place on the articles, of forms shown in Figs. 9, 12, 15, 18, 21, 24, 27, 29 and 31 respectively.

Fig. 22 is a perspective view of an article inserted in an adaptor conforming in shape to the configuration of wrapping made in accordance with this invention.

In the species of the invention shown in Figs. 1 to 6 inclusive, 40 is a quadrangular blank having attached thereto, contiguous therewith, and at opposite edges thereof, end walls 42. Adjacent end walls 42 and contiguous therewith, are top walls 44. Crease 43 is formed by creasing wall 42 inwardly along the line of juncture thereof with said blank 40, said line being designated as AA'. Turn 45 is formed by turning topwall 44 inwardly at its line of juncture with end walls 42, said line of juncture being designated as BB'.

Attention is directed to the fact that all inward turns, creases, etc., are designated by solid lines; where it is necessary to indicate an outward crease, turn, etc., the same will be designated on the drawings by means of a broken line.

Walls 42 and 44 have attached thereto, along the lateral edges thereof, members 46. It is to be noted that Fig. 6 comprises two similar sets of contiguous end and side walls 42 and 44 respectively. Each set has attached thereto along each of its two lateral edges corresponding members 46. The set to the right of the drawing is geometrically similar to the set on the left with the exception of the projections 72 attached to the former. Figs. 9, 12, 15, 18, 21, 24, 27, 29 and 31 respectively are partial stretch out views showing only a portion of blank 40, and a single set as aforesaid; thus only one top wall 44, one side wall 42, and two members 46 are shown in each of the aforementioned figures. In each set the members 46 are correspondingly folded and positioned, so for the sake of simplicity the specification will describe the folding and positioning of but a single member 46, or parts 48 and portions 50 corresponding thereto found in the several modifications.

It is to be understood that each of the respective side walls 56 are formed in an identical manner by means of corresponding elements as aforesaid.

The line of juncture between walls 42, 44 and member 46 is designated by line AC, said member 46 being plaited inwardly from walls 42 and 44 to form plait 47. Member 46 is bent outwardly along the transverse median BD thereof, the bend 49 being contiguous with, but opposed to the fold 45 along line BB'; the intersection of said fold 45 and said bend 49 being designated as point B. The outward bend 49 of member 46 along line BD serves to divide member 46 into a quadrangular part 48 and a quadrangular portion 50—the part 48 being adjacent the end 42 and the portion 50 being adjacent the top 44.

Part 48 and portion 50 have opposed diagonal flexions 51 and 53 extending to the free corners of member 46 from point B, the same being made on lines EB and FB of part 48 and portion 50 respectively.

The flexing of portion 50 inwardly, and the flexing of part 48 outwardly along the lines FB and EB respectively is continued until the corresponding areas 52 and 54 bordered by the lines EDB and FDB respectively, are in contact engagement.

When member 46 is positioned as above described, walls 42 and 44 will be at right angles to one another, and side walls 56 will be formed from member 46. Areas 52 and 54 are secured together at the outward corners thereof, at the vortexes of angles BED and BFD respectively, by means of adhesive 58. This adhesive is on the outside 60 of form 38 as shown and is adapted to secure areas 52 and 54 in engagement as aforesaid.

The placing of adhesive 58 on the outside 60 of form 38 is indicated by means of the broken patch lines, as shown in the drawings. The placing of adhesive on the inside 62 of form 38 is indicated by means of the unbroken patch lines.

Thus cover sections 64 are formed being hingedly joined to blank 40 by means of corresponding creases 43 formed at the junction of side walls 42 with blank 40 along lines AA'. The package 66 to be wrapped is then placed squarely on blank 40 and sections 64 are positioned in such manner that package 66 is covered.

Flaps 68 are joined to the other opposite sides of blank 40 along lines AA and A'A' respectively. These flaps are contiguous with blank 40 and are plaited inwardly at the point of junction therewith.

Flaps 68 carry on the free marginal edges thereof gum mixture 70 which may be rendered adhesive by moistening the same. These flaps 68 are then positioned in contact with sides 56 after said gum mixture has been moistened. Thus, the opposed cover sections 64 are fixedly secured in place. In order that these sections 64 may be secured more firmly, projections 72 have gum mixture thereon and the same will serve to attach said projections 72 to adjacent top wall 44 and side walls 56. Gum mixture 70 is placed on the inside of form 38 and is designated by means of stippling in the drawings.

Thus, it is readily seen that the invention comprises two end sections 56 made as aforesaid, and that these end sections are corresponding in all details except the fact that projections 72 are attached to only one section.

In order that the package wrapping will fold flat as shown in Fig. 1, it has been necessary to incorporate an outward crook 63 in each cover section 64, said crook 63 being formed along line GG' which is the median line of end 42. An inward wrinkle 65 at HG and an outward wrinkle 67 at HI are formed in member 46 after part 48 and portion 50 are in assembled relationship. When the elements forming end 56 are folded into compact relationship, wall 42 is folded back upon itself along lines GG', and area E, A, H, I, and area D, B, H, I, will lie in corresponding positions, said areas extending in the same direction as top wall 44 and co-terminal with the width thereof. The entire flat section 73 thus folded is creased over along line AA' whereby said sections 73 will overlap and be co-extensive with blank 40. Flaps 68 are then folded inwardly over the previously folded section 73 to form a flat package as shown in Fig. 1.

Figs. 7, 8 and 9 illustrate another modification of the invention. In this modification Fig. 9 shows a portion of a quadrangular blank 40 having attached thereto, contiguous therewith, and at the opposite edges thereof, end walls 42. Adjacent end walls 42 and contiguous therewith are top walls 44. Crease 43 is formed by creasing wall 42 inwardly along the line of juncture thereof with said blank 40, said line being designated as AA'.

Turn 45 is formed by turning top wall 44 inwardly at its line of juncture with end walls 42, said line of juncture being designated as BB'.

A part 48 and a portion 50 lie along the transverse edges of walls 42 and 44 respectively. The line of juncture between walls 42, 44 and part 48 and portion 50 is designated by line AC, said part 48 and portion 50 being plaited inwardly from walls 42 and 44 respectively to form plait 47. Top wall 44 is turned along turn 45 until it is at right angles with wall 42. Portion 50 will then overlie the area EDB on the outside of part 48. Part 48 and portion 50 are then secured together in this position by means of adhesive 58. This adhesive 58 is placed on the outside 60 of part 48 and on the inside 62 of portion 50, as shown in the drawings. Thus cover section 64 is formed having an end wall 42, a top wall 44 and a side wall 56, said cover section being hingedly joined to blank 40 by means of crease 43 formed at the junction of side walls 42 with blank 40 along lines AA'. After each section has been made in the aforesaid manner, the package 66 to be wrapped is placed squarely on blank 40 and sections 64 are positioned in such manner that package 66 is covered.

Flaps 68 are joined to the other opposite sides of blank 40 along lines AA and A'A' respectively. These flaps are contiguous with blank 40 and are plaited inwardly at the point of junction therewith. Flaps 68 carry on the free marginal edges thereof gum mixture 70 which may be rendered adhesive by moistening the same. These flaps 68 are then positioned in contact with sides 56 after said gum mixture has been moistened. Thus the opposed cover sections 64 are fixedly secured in place. In order that these sections 64 may be secured more firmly, projections 72 have gum mixture thereon and the same will serve to attach said projections 72 to adjacent top wall 44 and side walls 56.

In order that this package wrapping will fold flat as shown in Fig. 7, it is necessary to incorporate an outward crook 63 in each cover section 64, said crook being formed along line GG', which is the median line of end 42. An inward wrinkle 65 at HG and an outward wrinkle 67 at HI are formed in wall 56 after superimposed portion 50 and part 48 are in assembled relationship.

When the elements forming end 56 are folded into compact relationship, wall 42 is folded back upon itself upon line GG' and area EAHI and area DBHI will lie in corresponding positions, said areas extending in the same direction as top wall 44 and co-terminal with the width thereof. The entire flat section 72 thus folded is creased along lines AA' whereby said section 72 will overlap and be co-extensive with blank 40. Flaps 68 are then folded inwardly over the previously folded section 72 to form a flat package as shown in Fig. 7.

Figure 10:
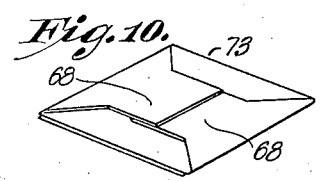
Figure 11:
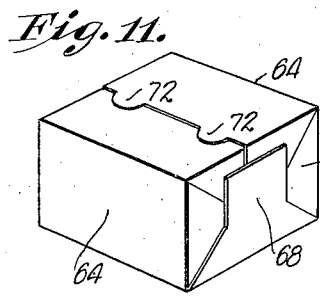
Figure 12:
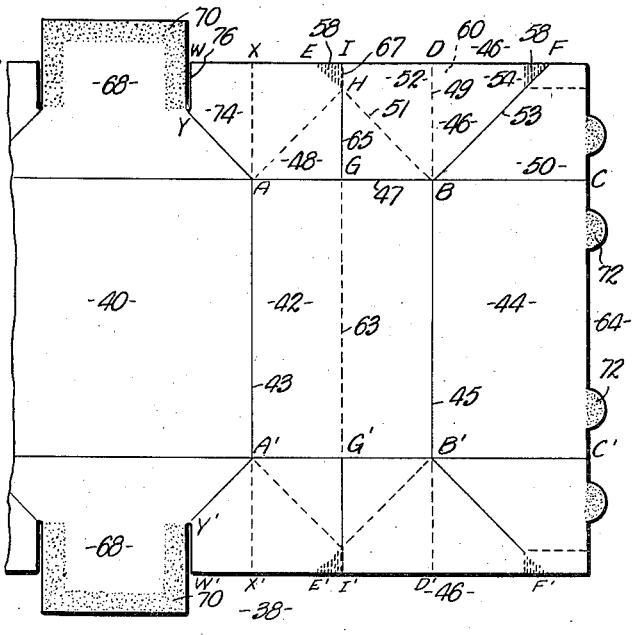

Figs. 10, 11 and 12 illustrate a modification of the invention. In this modification Fig. 12 shows a quadrangular blank 40 having attached thereto contiguous therewith, and at opposite edges thereof, end walls 42. Adjacent end walls 42 and contiguous therewith are top walls 44. Crease 43 is formed by creasing wall 42 inwardly along the line of juncture with said blank 40, said line being designated as AA'.

Turn 45 is formed by turning top wall 44 inwardly at its line of juncture with end walls 42, said line of juncture being designated as BB'. A member 46 is formed along the transverse edges of walls 42 and 44. The line of juncture between walls 42, 44 and member 46 is designated by line AC, said member 46 being plaited inwardly from walls 42 and 44 to form plait 47.

Member 46 is bent outwardly along the transverse median BD thereof, said bend 49 being contiguous with but opposed to the fold 45 along line BB'—the intersection of said fold and said bend being designated as point B. The outward bend 49 of member 46 along line BD serves to divide member 46 into a quadrangular part 48 and a quadrangular portion 50—the part 48 being adjacent the end 42 and the portion 50 being adjacent the top 44.

Part 48 and portion 50 have opposed diagonal flexions 51 and 53 extending to the free edges of member 46 from point B, the same being made on lines EB and FB of part 48 and portion 50 respectively. The flexing of portion 50 inwardly and the flexing of part 48 outwardly along the lines FB and EB respectively is continued until the corresponding areas 52 and 54 bordered by the lines EDB and FDB respectively are in contact engagement.

When member 46 is positioned as above described, walls 42 and 44 will be at right angles to one another, and side walls 56 will be formed from member 46. Areas 52 and 54 are secured together at the outward corners thereof at the vortexes of angles BED and BFD respectively, by means of adhesive 58. This adhesive is placed on the outside 60 of form 38 as shown in Fig. 12 and when so positioned, will be adapted to secure areas 52 and 54 in engagement as aforesaid.

Flaps 68 are joined to the opposite sides of blank 40 along lines AA and A'A' respectively. These flaps are contiguous with blank 40 and are plaited inwardly at the point of junction therewith. Between each of said flaps 68 and member 46 is a quadrangular piece 74. This piece 74 has a free edge 76 co-extensive and adjacent flap 68 on line WY. Piece 74 is contiguous with flap 68 on line AY and with member 46 on line AX, the same being crimped outwardly at the line of connection AX with the said member 46 and inwardly at the line of connection AY with the said flap 68. Thus, side walls 56 are formed having the reinforcing piece 74 adjacent thereto. The package 66 to be wrapped is placed squarely on blank 40 and sections 64 are positioned in such manner that package 66 is covered. Flaps 68 are secured to the sides 56 of the package wrapping in the same manner as hereinbefore described, in connection with the previous forms.

In order that the package wrapping will fold flat as shown in Fig. 10, it is necessary to incorporate an outward crook 63 in each cover section 64, said crook being formed along line GG', which is the median line of end 42. An inward wrinkle 65 at HG and an outward wrinkle 67 at HI are formed in member 46 after part 48 and portion 50 are in assembled relationship. When the elements forming end 56 are folded into compact relationship, wall 42 is folded back upon itself along lines GG', and area IHAX and area IHBD will lie in corresponding positions, said areas extending in the same direction as top wall 44 and co-terminal with the width thereof. Piece 74 is folded inwardly along crimp YA and outwardly along crimp XA and in such position will lie adjacent flap 68. The entire flat section 72 thus folded is creased over along line AA whereby said section 72 will overlap and be co-extensive with blank 40. Flap 68 with the piece 74 inwardly of and adjacent thereto, is then folded inwardly over the previously folded ends 70 to form a flat package as shown in Fig. 10.

Figure 13:
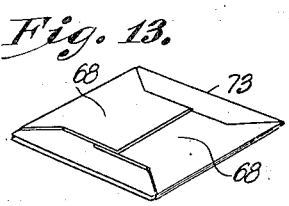
Figure 14:
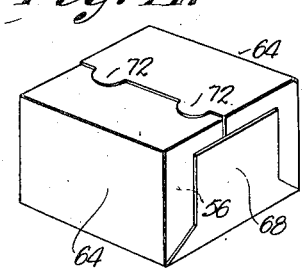
Figure 15:
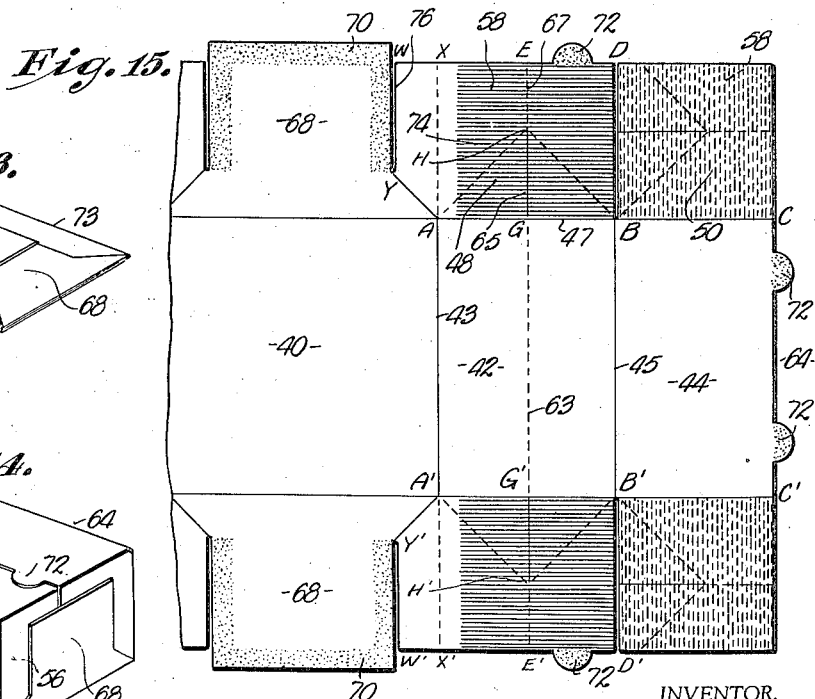

Figs. 13, 14 and 15 illustrate a modification of the invention. In this modification Fig. 15 shows a quadrangular blank 40 having attached therewith, contiguous therewith, and at the opposite edges thereof, end walls 42. Adjacent end walls 42 and contiguous therewith are top walls 44. Crease 43 is formed by creasing wall 42 inwardly along the line of juncture thereof with said blank 40, said line being designated as AA'. Turn 45 is formed by turning top wall 44 inwardly at its line of juncture with end walls 42, said line of juncture being designated as BB'.

A part 48 and a portion 50 lie along the transverse edges of walls 42 and 44.

The line of juncture between walls 42, 44 and part 48 and portion 50, respectively, is designated by line AC, said part 48 and said portion 50 being plaited inwardly from walls 42 and 44 respectively to form plait 47.

Top wall 44 is folded inwardly along fold 45 until part 48 and portion 50 overlap. The inside of part 48 is covered with adhesive 58 and the outside of portion 50 is covered with adhesive 58—thus the said surfaces of part 48 and portion 50 may be joined together by means of adhesive 58 to form a side wall 56.

Quadrangular piece 74 lies between flap 68 and part 48 and has two of its sides contiguous therewith. Piece 74 has a free edge 76 adjacent to a portion of flap 68 on line AY. Piece 74 has an inward crimp AY and an outward crimp AX at the lines of juncture with flap 68 and part 48 respectively. The package 66 to be wrapped is positioned on blank 40 and sections 64 are positioned in a manner as hereinbefore described in connection with the above modifications.

Flaps 68 have gum mixture 70 at the free marginal edges thereof for securing the flaps to side walls 56 as hereinbefore described. When flaps 68 are in operative position, piece 74 is folded thereagainst and between the flaps 68 and said side wall 56, thus serving to reinforce the wrapping.

In order to fold the package wrapping flat as shown in Fig. 13, it is necessary to incorporate an outward crook 63 in each cover section 64, said crook being formed along line GG', which is the median line of end 42. An inward wrinkle 65 at HG and an outward wrinkle 67 at HE are formed in part 48 and portion 50 respectively when the same are in assembled relationship. When the elements forming end 56 are folded into compact relationship, wall 42 is folded back upon itself along lines GG', and area EHAX, an area EHBD will lie in corresponding positions, said areas extending in the same direction as top wall 44 and co-terminal with the width thereof.

The entire flat section 73 thus folded is creased over along lines AA' whereby said sections 73 will overlap and be co-extensive with blank 40. Flap 68 with pieces 74 adjacent thereto are then folded inwardly over the previously folded sections 73 to form a flat package as shown in Fig. 13.

The form of the invention as illustrated in Figs. 16, 17 and 18 is exactly the same as the form illustrated in Figs. 13, 14 and 15 with the exception that lines FC, AC, XF, F'C', A'C', X'F' are tapered inwardly whereby said wrapper when assembled as described in connection with Figs. 13, 14 and 15 may be constructed to accommodate a container having larger dimensions at its top than at its bottom. Such container, as shown in Fig. 17, has a telescoping lid 78 which increases the dimensions of the top of the box and necessitates the use of this form of taper.

Edges DB and D'B' are cut at an angle to establish a taper of a degree required by the angularity just above mentioned. Manifestly these angles are determined by the lid 78 and remaining portion of the container. Likewise the shape of portions 50 may be altered at FC and F'C' to better accommodate an article of a particular shape.

Figs. 19, 20 and 21 illustrate another modification of the invention wherein 40 is a quadrangular blank having attached thereto, contiguous therewith, and at the opposite edges thereof, end walls 42. Adjacent end walls 42 are top walls 44. Crease 43 is formed by creasing wall 42 inwardly along the line of juncture thereof with said blank 40, said line being designated as AA'.

Turn 45 is formed by turning top wall 44 inwardly at its line of juncture with end walls 42, said line of juncture being designated as BB'.

A member 46 lies along the transverse edges of walls 42 and 44. The line of juncture between walls 42, 44 and member 46 is designated by line AC, said member 46 being plaited inwardly from walls 42 and 44 to form plait 47. Member 46 is bent outwardly along the transverse median BD thereof. This median BD extends along the line of greatest width of member 46. Co-extensive with line BD is the width of member 46 along lines GI and FZ. Member 46 is bent outwardly along the transverse median BD thereof, said bend 49 being contiguous with but opposed to the turn 45 along line BB'; the intersection of said turn 45 and said bend 49 being designated as point B. The outward bend 49 of member 46 along line BD serves to divide member 46 into a polygonal part 48 and a polygonal portion 50. Part 48 and portion 50 have opposed diagonal flexions 51 and 53 extending to the free edges of member 46 from point B to points K and L respectively; said flexions being made on line KB and LB of part 48 and portion 50 respectively. The flexing of portion 50 inwardly and the flexing of part 48 outwardly along lines LB and KB respectively is continued until the corresponding areas 52 and 54 bordered by lines IKBD and FLBD respectively are in contact engagement.

This wrapper accommodates a container having larger dimensions at its top than at its bottom when the angles IKX, FLS, I'K'X' and F'L'S' are greater than 90° as shown, and the shape of part 48 and portion 50 are altered as described in connection with Figs. 16, 17 and 18. The angles are substantially as shown whereby the wrapper will fit an article of the shape shown in Fig. 20.

When member 46 is positioned as above described, walls 42 and 44 will be at right angles to one another and side walls 56 will be formed from member 46. Areas 52 and 54 are secured together by means of adhesive 58 placed on the outside 60 of form 38 as shown in Fig. 21. Thus cover 64 are formed being hingedly joined to blank 40 by means of corresponding creases 43 formed at the junction of side walls 42 with blank 40 along line AA'.

Flaps 68 are joined to the opposite sides of blank 40 and are contiguous therewith. These flaps are plaited inwardly and positioned in the same manner as described in connection with the previous forms.

In order that the package will fold flat as shown in Fig. 19, it has been necessary to incorporate an outward crook 63 in each cover section 64, said crook 63 being formed along line GG', which is the median line of end 42. An outward wrinkle 65 at KG is formed in member 46 after part 48 and portion 50 are in assembled relationship.

When the elements forming end 56 are folded into compact relationship, wall 42 and member 56 are folded back upon themselves respectively along lines GG', GK and G'K'. Flaps 68 are then folded inwardly over form 40. The entire flat section 73 is creased over along line AA' whereby said section 73 will overlap blank 40 and flaps 68.

The form of invention as illustrated in Figs. 22, 23 and 24 is similar in the essentials of construction to the form shown in Figs. 13, 14 and 15, however, this form is especially designed to be used with an irregularly shaped package having an adaptor of specified dimensions placed thereon. Where round objects and the like are to be wrapped, it is a practice of the trade to place about said irregular package, a hollow, square-cornered adaptor in order to facilitate the wrapping of the article.

This adaptor 80 and irregularly shaped article 82 are shown in Fig. 22 with the article placed within the adaptor and a portion of the adaptor broken to more clearly reveal article 82.

Fig. 23 shows the wrapping in place on the adaptor but with flap 68 in an extended position before the same has been sealed in order to reveal an opening 84 in the wrapping through which the article 82 may be positioned within adaptor 80.

In this modification, form 38 has been cut so that when folded, opening 84 will be present therein, and further, the corners will be reinforced with a double thickness of material so as to better retain article 82 in place.

Fig. 24 shows a blank similar to that in Fig. 15, but the exterior free corners of part 48 and portion 50 have been removed therefrom; the length of quadrangular piece 74 being the same as the shortest dimension of part 48 along line XA.

Part 48 and portion 50 are positioned, folded, etc. in the same manner as part 48 and portion 50 of Fig. 15. The package wrapping may be folded flat in the same manner as illustrated in Fig. 13.

Figs. 25, 26 and 27 illustrate another modification of the invention. In this modification, Fig. 27 shows a quadrangular blank 40 having attached thereto, contiguous therewith, and at the opposite edges thereof, end walls 42. Adjacent end walls 42 and contiguous therewith are top walls 44.

Crease 43 is formed by creasing wall 42 inwardly along the line of juncture thereof with said blank 40, said line being designated as AA'. Turn 45 is formed by turning top wall 44 inwardly at its line of juncture with end walls 42, said line of juncture being designated as BB'.

A part 48 and a portion 50 lie along the transverse edges of walls 42 and 44 respectively. A line of juncture between walls 42, 44 and part 48 and portion 50 respectively, is designated by line AC, said part 48 and portion 50 being plaited inwardly from walls 42 and 44 respectively to form plait 47. Top wall 44 is turned along turn 45 until it is at right angles with wall 42. Portion 50 will then overlie area IHBD on the outside of part 48. Part 48 and portion 50 are then secured together in this position by means of adhesive 58. The adhesive 58 is placed on the outside 60 of part 48 and on the inside 62 of portion 50, as shown in the drawings—thus, cover section 64 is formed having an end wall 42, a top wall 44 and a side wall 56, said cover section being hingedly joined to blank 40 by means of crease 43 formed at the junction of the side walls. 42 with blank 40 along line AA'.

After each section 64 has been made in the aforesaid manner, the package 66 to be wrapped is placed squarely on blank 40 and sections 64 are positioned in such manner that the package 66 is covered.

Flaps 68 are joined to the opposite sides of blank 40 along line AA and A'A' respectively. These flaps are contiguous with blank 40 and are plaited inwardly at the point of junction therewith. Flaps 68 carry on the free marginal edges thereof, gum mixture 70 and are positioned by means thereof as hereinbefore previously described. In order that section 64 may be secured more firmly, projections 72 have gum mixture thereon and the same will serve to attach said projection 72 to adjacent top wall 44 and side walls 56.

This wrapper accommodates a container having larger dimensions at its top than at its bottom when the shape of part 48 and portion 50 is as shown in the drawings and described in connection with Figs. 16, 17 and 18.

In order that this package wrapping will fold flat as shown in Fig. 25, it is necessary to incorporate an outward crook 63 in cover section 64, said crook being formed along line GG', which is the median line of end 42. An outward wrinkle 65 at HG and H'G' is formed in wall 56 after superimposed portion 50 and part 48 are in assembled relationship.

When the elements forming end 56 are folded into compact relationship, wall 42 is folded back upon itself upon line GG'. The entire flat section 73 thus formed is creased along line AA'. Flaps 68 are then folded inwardly and section 73 superimposed over the said flaps 68.

Figs. 28 and 29 illustrate a modification of the invention. This modification in Fig. 29 shows a quadrangular blank 40 having attached thereto and contiguous therewith and at the opposite edges thereof, end walls 42. Adjacent end walls 42 and contiguous therewith are top walls 44.

Crease 43 is formed by creasing wall 42 inwardly along the line of juncture with said blank 40, said line being designated AA'. The turn 45 is formed by turning top wall 44 at its line of juncture with end walls 42, said line of juncture being designated as BB'.

An L-shaped member 46 is formed along the transverse edge of walls 42 and 44. The line of juncture between walls 42, 44 and member 46 is designated by line AC, said member 46 being plaited inwardly from walls 42 and 44 to form plait 47.

Member 46 is bent outwardly along line DB thereon, said bend being contiguous but opposed to the turn 45 along line BB'; the intersection of said turn and said bend being designated as point B. The outward bend 49 of member 46 along line BD serves to divide member 46 into a slotted part 48 and a portion 50, part 48 being adjacent end 42 and portion 50 being adjacent top 44.

Portion 50 has therein an inwardly flexed diagonal flexion 51 along line FB. The bending of portion 50 outwardly on bend 49 and the flexing of portion 50 inwardly on flexion 51 is continued until the outside of areas XDB and FDB are in overlying contact engagement, the said areas being secured together by adhesive 58. When the said above areas are positioned as stated, area FBCE of portion 50 will overlie the outside of area XBGH of part 48 and the inside of area DFB of portion 50. These areas are also secured together by means of adhesive 58.

Because of slot XI in part 48 area XIA is free to be folded over inwardly along line AI until it overlies area AIB and is secured thereto by means of adhesive 58.

When the entire member 46 has been positioned as above described, walls 42 and 44 will be at right angles to one another, and cover section 64 are thereby formed.

The package 66 to be wrapped is placed on blank 40 and sections 64 are positioned in such manner that package 66 is covered. Flaps 68 are secured to the sides of the package wrapping in the same manner as hereinbefore described.

In order that this package wrapping will fold flat, it is necessary to incorporate an outward crook 63 in cover section 64, said crook being formed along line LL' which is the median line of end 42. An inward wrinkle 65 at IL and I'L' is formed in wall 56 after superimposed portion 50 and part 48 are in assembled relationship.

When the elements forming end 56 are in assembled relationship, wall 42 is folded back upon itself upon line GG' and superimposed portions 50 and parts 48 are plaited inwardly on BC and B'C' until they are adjacent top wall 44. Superimposed areas XIA and AIB are wrinkled inwardly on IL and I'L' and plaited inwardly on AB and A'B' until they overlie end wall 42. The entire flat section 73 thus formed, is creased along line AA'. Flaps 68 are then folded inwardly over sections 73.

Figs. 30 and 31 illustrate a modification of the invention which is similar to the modification shown in Figs. 10, 11 and 12, however, this modification is like the preceding modification which is especially well adapted to be used in wrapping thin flat packages.

In this modification Fig. 31 shows a quadrangular blank 40 having attached thereto, contiguous therewith, and at pposite edges thereof, end walls 42. Adjacent end walls 42 and contiguous therewith are top walls 44. Crease 43 is formed by creasing walls 42 inwardly along the line of juncture with said blank 40, said line being designated as AA'. Turn 45 is formed by turning top wall 44 inwardly at its line of juncture with end walls 42, said line of juncture being designated as BB'.

A member 46 is formed along the transverse edges of walls 42 and 44. The line of juncture between walls 42, 44 and member 46 is designated as line AC, said member 46 being plaited inwardly from walls 42 and 44 to form plait 47.

Member 46 is bent outwardly along line BD thereof, said bend 49 of member 46 along line BD serves to divide member 46 into a part 48 and a portion 50—part 48 being adjacent end 42 and portion 50 being adjacent top 44. Part 48 and portion 50 have opposed diagonal flexions 51 and 53 extending to a slit 88 in member 46 from point B, and to slot 90 of member 46, the same being made on lines EB and FB of part 48 and portion 50 respectively. The flexing of portion 50 inwardly and the flexing of part 48 outwardly along the lines EB and FB respectively is continued until the corresponding areas 52 and 54 lying within lines EDB and FDB respectively, are in contact.

With member 46 positioned as above described, walls 42 and 44 will be at right angles to one another and side walls 56 will be formed from member 46. Areas 52 and 54 are secured together near the outward corners thereof by means of a tongue 92 and a tongue 94 at the edges of part 48 and portion 50 respectively, as shown in Fig. 31.

Flaps 68 are joined to the opposite sides of blank 40 along lines AA and A'A' respectively. These flaps are contiguous with blank 40 and are plaited inwardly at the point of junction therewith. Between each one of said flaps 68 and said member 46 is a quadrangular piece 74. This piece 74 has a free edge 76 adjacent a free edge of flap 68 on line WY. Piece 74 is contiguous with flap 68 on line AY and with member 46 on line AE; being crimped outwardly at the line of connection AX with said member 46 and inwardly at the line of connection AY with the said flap 68. Thus cover sections 64 are formed having the reinforcing piece 74 adjacent thereto. The package 66 to be wrapped is placed on blank 40 and sections 64 are positioned in such manner that package 66 is covered. Flaps 68 are secured to sides 56 of the package wrapping in the same manner as hereinbefore described in connection with the previous forms.

In order that the wrapping will fold flat as shown in connection with Fig. 10, it is necessary to incorporate an outward crook 63 in each cover section 64, said crook being formed along line GG' which is the median line of end 42. An inward wrinkle 64 at EG and an outward wrinkle 67 at HE are formed in member 46 after part 48 and portion 50 are in assembled relationship.

When the elements forming side 56 are folded into compact relationship, wall 42 is folded back upon itself along line GG' and area EXA will be superimposed over area HEBD. Piece 74 is folded inwardly along crimp YA and outwardly along crimp XA and in such position, will lie adjacent flap 68. The entire section 72 thus folded is creased over along lines AA, whereby said section 72 will overlap and be co-extensive with blank 40. Flap 68 with piece 74 inwardly of and adjacent thereto, is then folded inwardly over the previously folded end 70 to form a flat package similar to that shown in Fig. 10.

Having thus described the invention, what is claimed as new and desired to be secured by Letters Patent is:

1. A pre-formed package wrapping of the character described comprising a quadrangular blank; and opposed cover sections attached to opposite edges of the blank, each section having adjoining end, top and side walls, said end walls being contiguous with said blank, and creased inwardly at the junctions therewith, said top walls being contiguous with and folding inwardly at the line of juncture with said end walls, each of said side walls being respectively comprised of a quadrangular member contiguous with and plaited inwardly from said end and top walls, said member being bent outwardly along the transverse median thereof, said bend being contiguous with but opposed to the fold at the line of juncture of the end walls and the top wall adjacent thereto, said bend extending outwardly from a point on the plait and dividing said member into a quadrangular part and a portion, the part being adjacent the end and the portion being adjacent the top, said part and said portion having corresponding opposed diagonal flexions, said flexions extending from said point on the plait, the flexion of the portion adjacent the top being inwardly and the flexion of the part adjacent the end being outwardly, said part and said portion forming areas in overlying relation and secured together.

2. A pre-formed package wrapping of the character described comprising a quadrangular blank; opposed cover sections attached to opposite edges of the blank, each section having adjoining end, top and side walls, each end walls being contiguous with said blank, and creased inwardly at the junctions therewith, said top walls being contiguous with and folding inwardly at the line of juncture with said end walls, each of said side walls being respectively comprised of a quadrangular member contiguous with and plaited inwardly from said end and top walls, said member being bent outwardly along the transverse median thereof, said bend being contiguous with but opposed to the fold at the line of juncture of the end walls and the top wall adjacent thereto, said bend extending outwardly from a point on the plait and dividing said member into a quadrangular part and a portion, the part being adjacent the end and the portion being adjacent the top, said part and said portion having corresponding opposed diagonal flexions, said flexions extending from said point on the plait, the flexion of the portion adjacent the top being inwardly and the flexion of the part adjacent the end being outwardly, means for securing said part and said portion together in overlying relation to each other to preform said cover sections; and opposed flaps attached to the other edges of the blank for overlying said side walls.

BILL Y. JAMES.